US007081286B2

(12) United States Patent
Benim et al.

(10) Patent No.: US 7,081,286 B2
(45) **Date of Patent: *Jul. 25, 2006**

(54) MICROWAVE SUSCEPTIBLE INSULATED LABEL AND PACKAGING MATERIAL

(75) Inventors: Thomas E. Benim, Goodlettsville, TN (US); Jeffrey A. Chambers, Hockessin, DE (US); Steven R. Cosentino, Quinton, VA (US); Peter R. Hunderup, Richmond, VA (US); Susan G. Chamberlin, Wilmington, DE (US); Ross A. Lee, Chesapeake City, MD (US); Susan D. Procaccini, Hockessin, DE (US); Donna L. Visioli, Lower Gwynedd, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 99 days.

This patent is subject to a terminal disclaimer.

(21) Appl. No.: 10/270,802

(22) Filed: Oct. 15, 2002

(65) Prior Publication Data

US 2003/0124258 A1 Jul. 3, 2003

Related U.S. Application Data

(63) Continuation-in-part of application No. 09/832,503, filed on Apr. 11, 2001.

(51) Int. Cl.
*B32B 1/08* (2006.01)

(52) U.S. Cl. ...................... 428/35.3; 428/113; 428/202; 428/209; 428/35.2; 428/34.3; 428/35.8; 428/40.9; 428/41.1

(58) Field of Classification Search ................. 428/113, 428/202, 209, 35.2, 34.3, 35.3, 35.8, 40.9, 428/41.1
See application file for complete search history.

(56) References Cited

U.S. PATENT DOCUMENTS

| | | | | |
|---|---|---|---|---|
| 3,401,475 A | | 9/1968 | Morehouse et al. | |
| 4,139,773 A | * | 2/1979 | Swanson | 250/423 R |

(Continued)

FOREIGN PATENT DOCUMENTS

| | | |
|---|---|---|
| DE | 130564 | 4/1978 |
| EP | 0101340 A1 | 2/1984 |
| EP | 1064897 A1 | 1/2001 |
| WO | WO 91/04152 A1 | 4/1991 |

OTHER PUBLICATIONS

Encyclopedia of Polymer Science and Engineering, vol. 18, Styrene Polymers to Toys, John Wiley & Sons, NY, 1989, pp. 737–738.

U.S. Appl. No. 09/832,503, filed Apr. 11, 2001, Benim et al.

U.S. Appl. No. 10/270,801, filed Oct. 15, 2002, Benim et al.

U.S. Appl. No. 10/271,377, filed Oct. 15, 2002, Benim et al.

www.3M.com, 3M™ Composite Electrical Tape.

McIntyre, Professor J. E., Daniels, P.N., Editors, Textile Terms and Definitions, 1997, p. 68, p. 351, 10th Edition, The Textile Institute, Biddles Limited, UK.

*Primary Examiner*—Stephen Kalafut
*Assistant Examiner*—Jane Rhee

(57) ABSTRACT

A microwave susceptible insulated packaging material includes a thermal insulating layer, which may be a fiberfill batt. The insulating layer is laminated to at least one layer of a co-extruded film which has been coated on one surface with a microwave susceptible material, such as aluminum or aluminum coated with a food-safe contacting polymer sealant. The packaging material can be used to form a container, such as a pouch, or as a label or as a lining for a container. The packaging material may be coated also with a printable coating material.

12 Claims, 9 Drawing Sheets

U.S. PATENT DOCUMENTS

| | | | | | |
|---|---|---|---|---|---|
| 4,273,816 | A | * | 6/1981 | Tollette | 428/34.2 |
| 4,801,514 | A | * | 1/1989 | Will et al. | 429/167 |
| 4,871,597 | A | | 10/1989 | Hobson | |
| 4,892,782 | A | * | 1/1990 | Fisher et al. | 442/76 |
| 5,164,254 | A | | 11/1992 | Todd et al. | |
| 5,404,667 | A | | 4/1995 | Schmitter | |
| 5,453,326 | A | | 9/1995 | Siddiqui | |
| 5,527,600 | A | | 6/1996 | Frankosky et al. | |
| 5,725,966 | A | * | 3/1998 | Abe et al. | 429/167 |
| 6,150,013 | A | | 11/2000 | Balaji et al. | |
| 6,286,872 | B1 | * | 9/2001 | Barre | 283/81 |
| 6,379,764 | B1 | | 4/2002 | Pusateri et al. | |
| 6,620,281 | B1 | * | 9/2003 | Sommers | 156/248 |
| 2003/0129335 | A1 | * | 7/2003 | Benim et al. | 428/35.7 |

* cited by examiner

MICROWAVE SUSCEPTIBLE INSULATED LABEL AND PACKAGING MATERIAL

CROSS-REFERENCE TO RELATED APPLICATION

This application is a continuation-in-part of U.S. patent application Ser. No. 09/832,503, filed Apr. 11, 2001, now pending.

BACKGROUND OF THE INVENTION

1. Field of the Invention

The present invention relates to an insulated packaging material which comprises a film of first and second face material layers laminated to a thermal insulating layer and a microwave susceptible coating applied to the second face material layer so that the second layer is preferentially heated by microwave radiation. The first face material layer can be coated with a coating material so that it is printable to form a combination microwave susceptible insulated label and packaging material.

2. Description of Related Art

Insulated enclosures for containers are known, such as that disclosed in U.S. Pat. No. 4,871,597. This enclosure includes a first, or inner-most fabric layer, a second inner-most insulating layer which includes a polymeric foam, a third inner-most metallized polymer film reflective layer, and an outer-most fabric mesh layer. However, the use of four different layers, although providing good insulation for the container, can be cumbersome, which limits the flexibility of the packaging material.

Also known in the film art is a thin electrical tape which comprises a polyester web-reinforced polyester film, as disclosed in 3M Utilities and Telecommunications OEM. However, this tape, which at its thickest is 0.0075 inch (0.0190 cm.), is not suitable for use as an insulated packaging material.

Composite materials for use as microwave susceptors are also known. U.S. Pat. No. 5,021,293 shows a polyethylene terephthalate film coated with flakes of electrically conductive metal or metal alloy. U.S. Pat. No. 4,892,782 shows drapable liquid permeable woven or nonwoven fibrous dielectric substrates that are coated with susceptor materials which can be wrapped around food items for microwave heating. These patents do not disclose both microwave susceptible and insulated packaging materials, nor such packaging materials that may also be printed as labels.

Thus, there exists a need to design an insulated packaging material which is inexpensive to manufacture. Such an insulator would be thick enough to provide adequate insulation, but thin enough to be flexible. Ideally, such packaging material also would be printable to form a label.

BRIEF SUMMARY OF THE INVENTION

The present invention overcomes the problems associated with the prior art by providing an insulated packaging material that has a component which is preferentially heated by microwave radiation. The is insulated packaging material has enough loft, i.e., is thick enough (greater than 0.0075 inch (0.0190 cm)) so as to provide adequate insulation when used, for example, as an insulated pouch, but is thin enough so that it is flexible, and can be formed into such pouch form for wrapping around a food article. The insulated packaging material of the present invention is printable, thereby enhancing its use as a packaging material.

Another advantage of the insulated packaging material of the present invention is that it is less costly to manufacture than known laminated structures formed with adhesives, since in a preferred embodiment it includes a co-extruded bi-layer film with a heat-sealable adhesive layer which is used to adhere (thermally bond) the film to an insulating layer. Prior to adhering the film to the insulating layer, a microwave susceptible coating is applied to the film layer.

Moreover, in the preferred embodiment where the film and the insulating layer are both made of polyester, and include compatible adhesives, the insulated label and packaging container stock of the present invention is wholly recyclable, thereby providing significant environmental advantages over known packaging materials of the prior art.

In accordance with the present invention, the insulated packaging material of the present invention comprises a thermal insulating layer having a thermal resistance of 0.05 to 0.5 CLO (0.0077 to 0.077 $m^2$*K/W) which is laminated to a face material, and wherein the Insulated packaging material has a thickness in the range of 0.0075 inch (0.0190 cm) to 0.07 inch (0.1778 cm). A microwave susceptible layer is coated onto the face material, and preferably a sealant is applied over the microwave susceptible layer.

In a further aspect, the present invention is a method for making an insulating label stock in which a sheet of face material is formed as a co-extruded film having a first layer and a second layer, wherein said second layer has a lower melting temperature than said first layer, and a microwave susceptible coating is applied to a surface of the second layer. Then the sheet is fed together with a thermal insulating layer having a thermal resistance in the range of 0.05 to 0.5 CLO (0.0077 to 0.077 $m^2$*K/W) into a calender roll nip to cause the sheet and thermal insulating layer to be laminated together to form the insulating label stock having a thickness of at least 0.0075 inch (0.0190 cm).

Preferably, the microwave susceptible coating is a material selected from the group consisting of: aluminum, stainless steel, nickel/iron/molybdenum alloys and nickel/iron/copper alloys, and such metal may be coated with a polymer sealant coating. Preferably, the microwave susceptible coating is applied by vapor coating. Preferably, the polymer sealant coating is a layer of polyester copolymer, poly (vinylidene chloride), or a copolymer of ethylene with vinyl acetate. Such polymers are safe for food contact.

DETAILED DESCRIPTION OF THE INVENTION

In accordance with the present invention, there is provided an insulated packaging material. Such a material is shown generally at 5 in FIGS. 1 and 1*a* and rolled up at 220 in FIG. 5. The packaging material is cut into individual lengths to make packages, such as a pouch 300 shown in FIG. 2 or a label 15 which is shown applied to a container 100 in FIGS. 3 and 4.

Figure 1:
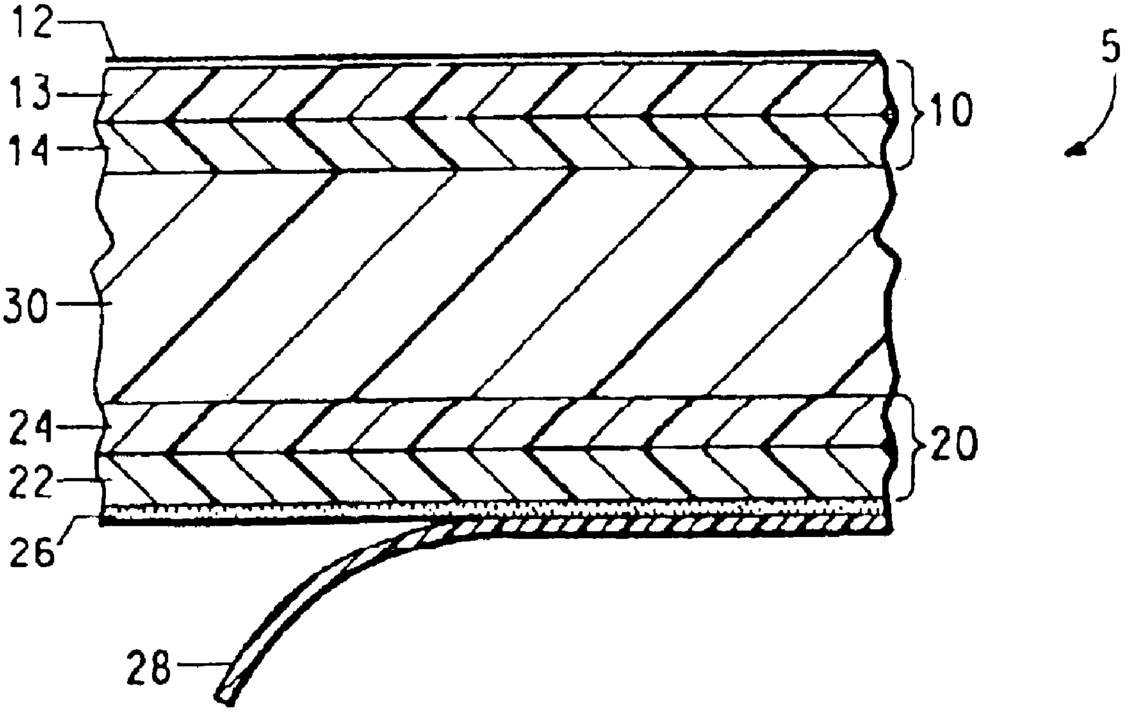
FIG. 1 is a cross-sectional view of an insulated packaging material according to the present invention, showing face material on both sides of a thermal insulating layer.
Figure 1A:
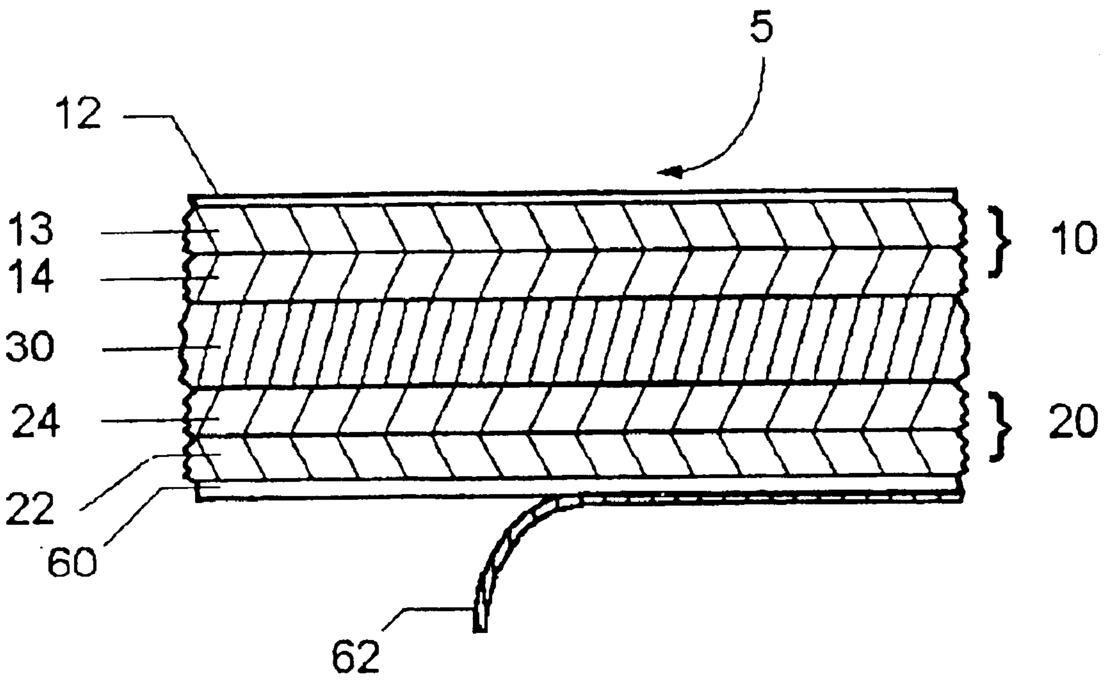
FIG. 1*a* is a cross-sectional view of an insulated packaging material with a microwave susceptible layer.

The insulated packaging material of the present invention includes a thermal insulating layer, shown at 30 in FIGS. 1 and 1*a*. This thermal insulating layer 30 has a thermal resistance, as measured in units of insulation or CLO, of 0.05 to 0.5. The CLO unit is defined as a unit of thermal resistance of a garment. The SI unit of thermal resistance is the square-meter kelvin per watt ($m^2$*K/W) (See "Textile Terms and Definitions" Tenth Edition, The Textile Institute, (1995), pp. 66, 350). Thus, the range of thermal resistance In SI units of the thermal insulating layer of the present Invention is 0.0077 to 0.077 $m^2$*K/W. Although CLO is defined in terms of a garment, this measurement can be used to describe the thermal resistance of any textile system, and is used herein to describe the thermal resistance of the thermal insulating layer of the present invention. CLO values depend on the material used for the insulating layer and its thickness. CLO values of labels made without the thermal insulating layer of the present invention were below the lower end of the range (0.05 CLO, or 0.0077 $m^2$*K/W).

The thermal insulating layer 30 comprises an organic thermoplastic fiber based material comprising polyester, polyethylene or polypropylene. In a preferred embodiment, the thermal insulating layer is a fiberfill batt comprising polyester. A fiberfill batt sold as THERMOLITE® Active Original by E.I. du Pont de Nemours and Company is especially suitable for use with the present invention. The fiberfill batt used with the present invention has an areal weight in the range of 10 gm/$m^2$ to 200 gm/$m^2$, and a bulk density of less than 0.3 gm/$cm^3$. Alternatively, the thermal insulating layer may comprise melt blown fibers, such as melt blown polyolefins, sold as THINSULATE®, by 3M.

Many other variations of insulating material for the thermal insulating layer can be used with the present invention. For instance, the thermal insulating layer may comprise a foam, such as foamed polypropylene, or any other foam composition as known in the art that may be subjected to microwave heating. Or the thermal insulating layer may be made of an inorganic fiber based material comprising glass wool, borosilicate glass or rockwool.

Alternatively, the thermal insulating layer may comprise a knit fabric, made, for example from a tetrachannel or scalloped oval fiber, sold under the trademark COOLMAX® by E.I. du Pont de Nemours and Company of Wilmington, Del. Or the thermal insulating layer may be a woven or fleece material. The insulating layer could also comprise some sort of nonwoven, such as felt, or a highloft nonwoven or needled nonwoven fabric.

The thermal insulating layer is laminated to multi-layer face materials, shown at 10 and 20 in FIGS. 1 and 1*a*. By "lamination" is meant uniting layers of material by an adhesive, by heating or other means.

The face material 10 may be film, paper and/or fabric. The film is made of a thermoplastic material comprising either polyester, polyethylene or polypropylene. In the embodiment illustrated in FIG. 1, the thermal insulating layer 30 is laminated between two sheets of face material 10, 20 of film, paper or fabric. However, it is within the scope of the present invention to laminate a single sheet of face material to the thermal insulating layer. The use of a single sheet of face material will not affect the thickness of the packaging material substantially, since the thickness of the face material is insignificant compared to the total thickness of the packaging material. The packaging material of the present invention is greater than 0.0075 inch (0.0190 cm.) thick, so that it is thick enough to provide adequate insulation for a package. However, the packaging material should be thin enough to be flexible, and should be preferably less than 0.07 inch (0.1778 cm). Face material 10, including first layer 13 and second 14 layer as shown in FIGS. 1 and 1*a*, and face material 20, including first layer 22 and second layer 24 and microwave susceptible coating 60 as shown in FIG. 1*a* may be of thickness between 0.0002 inch (0.0005 cm) and 0.010 inch (0.025 cm). A preferred range for the thickness of the face material is 0.00048 inch (0.00121 cm) to 0.0020 inch (0.0050 cm).

The microwave susceptible coating 60 preferably is a metal or metal alloy, such as aluminum, stainless steel, nickel/iron/molybdenum alloys and nickel/iron/copper alloys. The coating 60 is applied to an outer surface of first layer 22, preferably by vapor coating or alternatively by coating a solution of metal particles dispersed in a solvent over a surface of the layer 22. The coating 60 could also be applied to second layer 24 before joining layers 22, 24 together if layers 22 and 24 are separate layers. For a metal or metal alloy as the susceptor, the preferred coating thickness is from about 20 to 100 Angstroms, preferably from about 50 to 70 Angstroms. Alternatively, the coating thickness for a metallic microwave susceptible coating may be measured in optical density as measured with a Tobias TBX Densitometer, offered by Tobias Associates, Inc. of Glenside, Pa., USA, and preferably is in the range of from about 0.35 to 0.12.

Typically, metallic vapor deposition is performed in a vacuum using a DC arc process. The arc is focused on a cathode of the metal to be deposited (e.g., aluminum). The metal is vaporized and comprises a mixture of ions and charged metallic droplets of small size and size distribution. As is well known to those skilled in the art, the vaporized metal is manipulated with electric fields and focused on the substrate to be coated with the metal. Vapor deposition equipment is available from Vapor Technologies, Inc. of Boulder, Colo., USA. Evaporative vacuum coating equipment is available from Galileo Vacuum Systems, Inc. of East Granby, Conn., USA.

As shown in FIG. 1*a*, a sealant 62 coats the microwave susceptible coating 60. The sealant 62 comprises a layer of one or more polymers, such as a polyester copolymer, poly(vinylidene chloride), or a copolymer of ethylene with vinyl acetate. In embodiments without a microwave susceptible material, the sealing material may be applied directly to the polyester base sheet after the sheet is extruded, and either before or after the sheet is oriented. These sealant coating polymers are safe for food contact. The polymer sealant layer preferably has a thickness in the range of 0.0025 mil to 5 mil ($6.35\times10^{-6}$ cm to 0.0127 cm). It may be applied to the face material as a co-extruded web structure, optionally with an oxygen barrier. If the co-extruded web structure has an oxygen barrier, the web structure preferably includes in addition to the sealant layer, an oxygen barrier layer material, such as poly(vinylidene chloride) or ethylene-vinyl alcohol (EVOH).

Figure 1B:
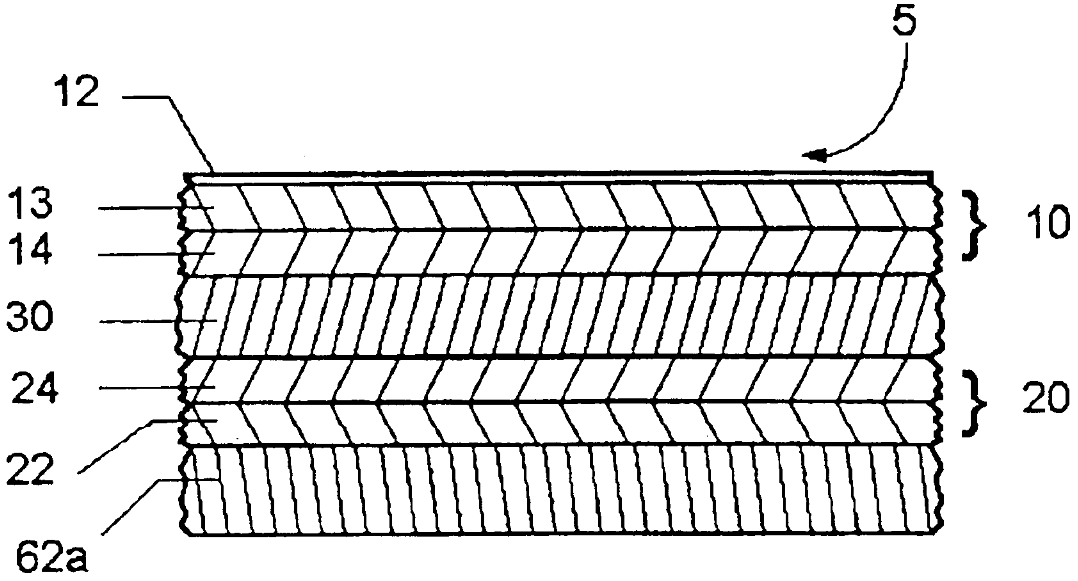
FIG. 1*b* is a cross-sectional view of another insulated packaging material according to the present invention, showing face material on both sides of a thermal insulating layer and with a thicker polymer film applied to one of the face material layers to enable the insulated packaging material to support a fitment when the material is formed into a pouch.

Referring to FIG. 1*b*, sealing material 62*a* may be a polyethylene or ethylene copolymer having a thickness greater than the sealing material 62 in FIG. 1*a*. The thickness of sealing material 62*a* is in the range of 0.005 mil to 5 mil ($12.7\times10^{-6}$ cm to 0.0127 cm) to enable attachment of a fitment 314 to the pouch 310 shown in FIG. 8.

In a preferred embodiment, hereinafter referred to as the "co-extruded film" embodiment, the face material comprises a film which is co-extruded so that it comprises two layers. Thus, face material 10 comprises a first layer 13 and a second layer 14. In this embodiment, first layer 13 and second layer 14 are made of different materials, but form one sheet of film following the extrusion. Second layer 14 is heat sealable—i.e., it is made of a material which has a lower melting temperature than the material of first layer 13, so that when face material 10 is heated, second layer 14 softens and adheres to the thermal insulating layer when pressure is applied.

Similarly, face material 20 comprises a first layer 22 and a second layer 24. Again, first layer 22 and second layer 24 are made of different materials, but form one sheet of film. Second layer 24 is heat sealable—i.e., it is made of a material which has a lower melting temperature than the material of first layer 22, so that when face material 20 is heated, second layer 24 softens and adheres to the thermal insulating layer when pressure is applied.

Alternatively, rather than "co-extrusion", layers 13 and 14 and 22 and 24 may be formed by coating separate layers of polymer solution onto the surfaces of the thermal insulation layer.

The packaging material of the present invention can further include a coating on the face material. The coating, shown at 12 in FIGS. 1 and 1*a*, is provided on the non-heat sealable surface (i.e., first layers 13 and 22) of the face material. This coating 12 is printable, so that the packaging material 5 may also function as a label. The coating 12 is a standard print primer based on aqueous polymer dispersions, emulsions or solutions of acrylic, urethane, polyester or other resins well known in the art. (See, for example, U.S. Pat. No. 5,453,326). Alternatively, if the thermal insulating layer is previously printed, and the face material is clear, the need for coating the face material to make it printable may be eliminated.

In a preferred configuration of the co-extruded film embodiment, films with two different thicknesses are used for the face materials, such as face material 10 and face material 20 in FIG. 1. One specific example of a film which is suitable for use as face material 10 in FIG. 1 is MELINEX® 854, commercially available from DuPont Teijin Films of Wilmington, Del. MELINEX® 854 is a 120 gauge (0.0012 inch, or 0.0030 cm.) thick co-extruded biaxially oriented polyester film. The first is layer of this film, such as 13 in FIG. 1, is made from a standard polyester homopolymer, intrinsic viscosity of about 0.590, containing 2500 ppm inorganic slip additive particles. This layer comprises approximately 65% of the total film thickness. A co-polyester resin comprised of 18 weight % isophthalic acid, intrinsic viscosity of about 0.635, containing 2300 ppm inorganic slip additive particles, is co-extruded to form the heat sealable layer (such as 14 in FIG. 1) and comprises 35% of the total film thickness (15–40% preferred). The surface of the first layer opposite the heat sealable layer is coated in-line by a gravure coater (during the film manufacturing process) with a print primer coating (12 in FIG. 1) based on an aqueous polyester dispersion described earlier at a dry coat-weight of 0.03 $g/m^2$. MELINEX® 854 film is also suitable for use as face material 20 in FIG. 1, but this face material is slightly thinner than the face material used as face material 10. In all other aspects, the MELINEX® 854 film used as face material 20 is the same as the MELINEX® 854 film used as face material 10 described above.

According to another aspect of the present invention, the face material may be modified on the surface facing away from the thermal insulating layer to facilitate printing thereon by a corona discharge treatment. Specifically, the surface of first layer 13 or 22 is modified. The corona discharge treatment may be done in addition to, or in lieu of, the coating on the face material. Or, alternatively, on top of the coating, or instead of the coating, a vapor deposited metal layer, such as an aluminum layer, may be deposited on the surface facing away from the thermal insulating layer for decorative purposes and for adding optical effects and/or water and gas barrier properties. If this vapor deposition is done, then corona discharge treatment would typically not be performed in addition to this vapor deposition.

According to another modification of the present invention, the face material may be embossed on the surface facing away from the thermal insulating layer in such patterns as may be desired for decoration. The embossing can be done on top of the coating, after corona discharge treatment, if required, and on top of the vapor deposition.

Specifically, pressure and heat may be used to make certain areas of the face material thinner, so that the surface appears raised from the areas which were made thinner. Doing so in a pattern may be used to ornament the packaging material. The heat and pressure may be applied by a shaped anvil or iron in a decorative pattern. Alternatively, heat and pressure may be applied by an engraved or etched embossing roller or an engraved reciprocating die in a platen press. The heat should be applied at 200–400° F. (93–204° C.), so that the pressure applied would create permanent indentations in the packaging material. The heat should be applied as to soften at least the face material, and perhaps also the thermal insulating layer. Softening the thermal insulating layer is less critical than softening the face material, but helps the embossing process also.

In addition, the surface modification (i.e., the coating or the corona discharge treatment) may be used to facilitate bonding to another surface with an adhesive layer. In order to bond to another surface, an adhesive layer, such as that shown at 26 in FIG. 1, is applied to the untreated surface of the face material or to the corona discharge treated surface (but not to a vapor deposition modified or embossed surface). This adhesive layer is pressure sensitive to enable application of the label to a container. In addition, a release liner 28 may be provided on the surface of adhesive layer 26 as shown in FIG. 1. The function of the release liner is to protect the adhesive until the point of application of the label to a container.

The packaging material 5 of the present invention may be formed as a label stock 15 and sealed, such as with a hot knife, at its edges so that fluid cannot penetrate the edges of the label stock. Such edges are shown at 132 in FIGS. 3 and 4. Alternatively, the packaging material may be self-sealing. In this self-sealing configuration, the packaging material may be folded back onto itself, so that the top and bottom edges are already sealed. A package or pouch 300 made from the packaging material of the present invention (FIG. 2) is preferably sealed so that fluid cannot penetrate the edges thereof.

The system in one aspect comprises a container wrapped with an insulating label stock 15 so as to cover a significant portion of the surface area of the container. The container may be a can or cup, shown at 90 and 140 in FIGS. 3 and 4, for safe storage and consumption of beverages and foods.

Figure 2:
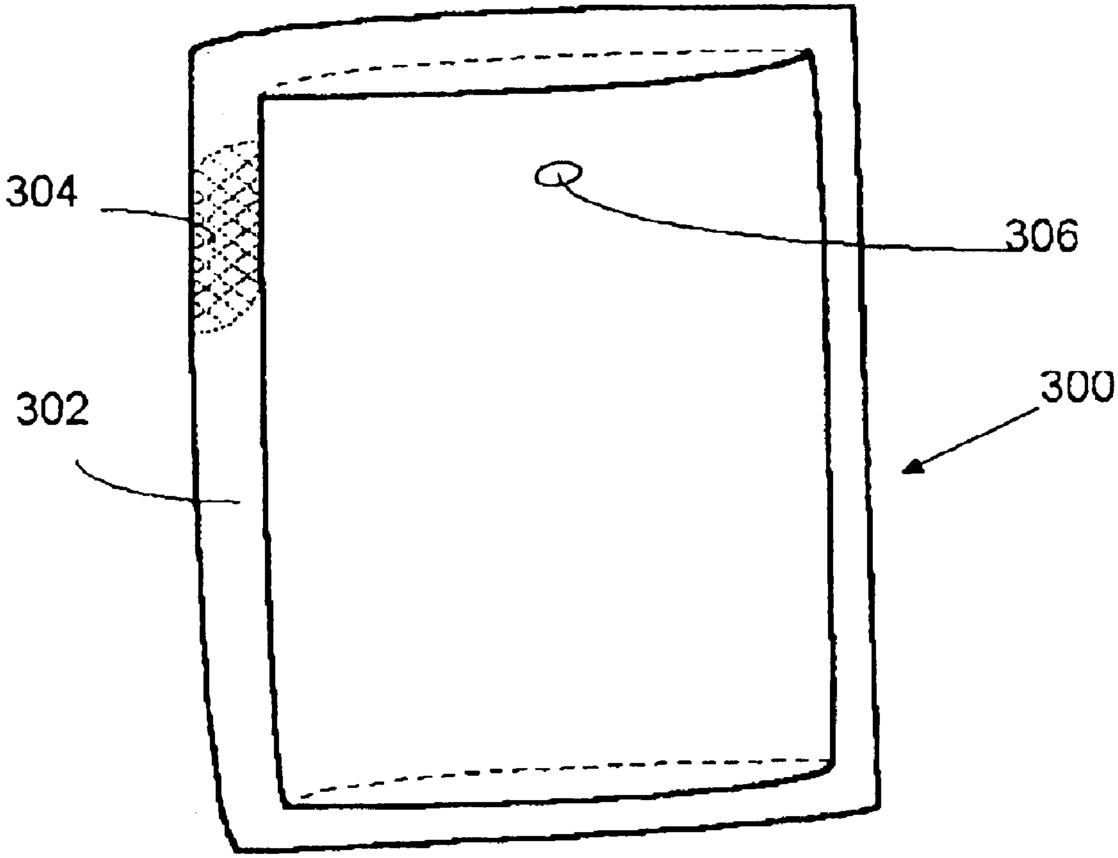
FIG. 2 is a perspective view of a pouch formed from a label and packaging stock in accordance with the present invention.
Figure 3:
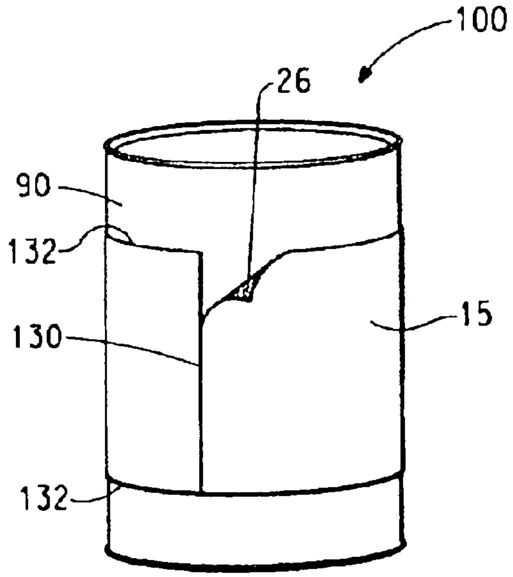
FIG. 3 is a perspective view of a container wrapped with a label cut from a label and packaging stock in accordance with the present invention.

Alternatively, in a second aspect the container may be a pouch 300, shown in FIG. 2, where the insulating label stock 15 has been formed into a pouch shape. Various form-fill-seal pouching machines and stand-up pouch forming machines for forming pouches suitable for holding foodstuff and liquids are known in the art, such as an Emzo® EV1 vertical liquid pouch packaging machine available from Emzo Corp., formerly of Argentina, or a Bartelt IM offered by Klockner Bartelt of Sarasota, Fla., USA, or a Toyo Model MS offered by Toyo Machine Mfg. Co. of Nagoya, Japan. Generally, under applied compression pressure and heat, such as by a heat bar in pouch making equipment, the polymer sealant material softens and adheres together to form the sealed peripheral edge.

In one region of the pouch, a frangible seal 304 portion is formed along the outer periphery. The frangible seal ruptures more easily than the other sealed regions. For example, the frangible portion 304 will break or separate when heated to the softening point or melting point of the sealant material forming the frangible portion. The portion 304 of the sealed peripheral edge of the pouch may be made frangible by heat sealing this portion at a lower temperature or by sealing this portion with a sealing bar that applies a lower sealing pressure at 304. Alternatively, one or more frangible seals may be incorporated within the volume of the pouch to create separate compartments (not shown) that keep apart foodstuffs within the pouch until the frangible seals rupture upon heating or upon applied pressure.

The temperature at which the frangible portion 304 separates or ruptures varies according to the sealant selected. In one embodiment, the frangible seal ruptures when the temperature inside the container or pouch exceeds the sealant's melting point or softening point. For the polymers used in the facing material of the instant insulated packaging material, the frangible seals generally rupture when the temperature inside the container or pouch formed from the material exceeds 100° C. (212° F.).

A frangible target 306 or access port for accessing the pouch volume with a straw also may be provided on one side surface of the pouch 300.

Figure 8:
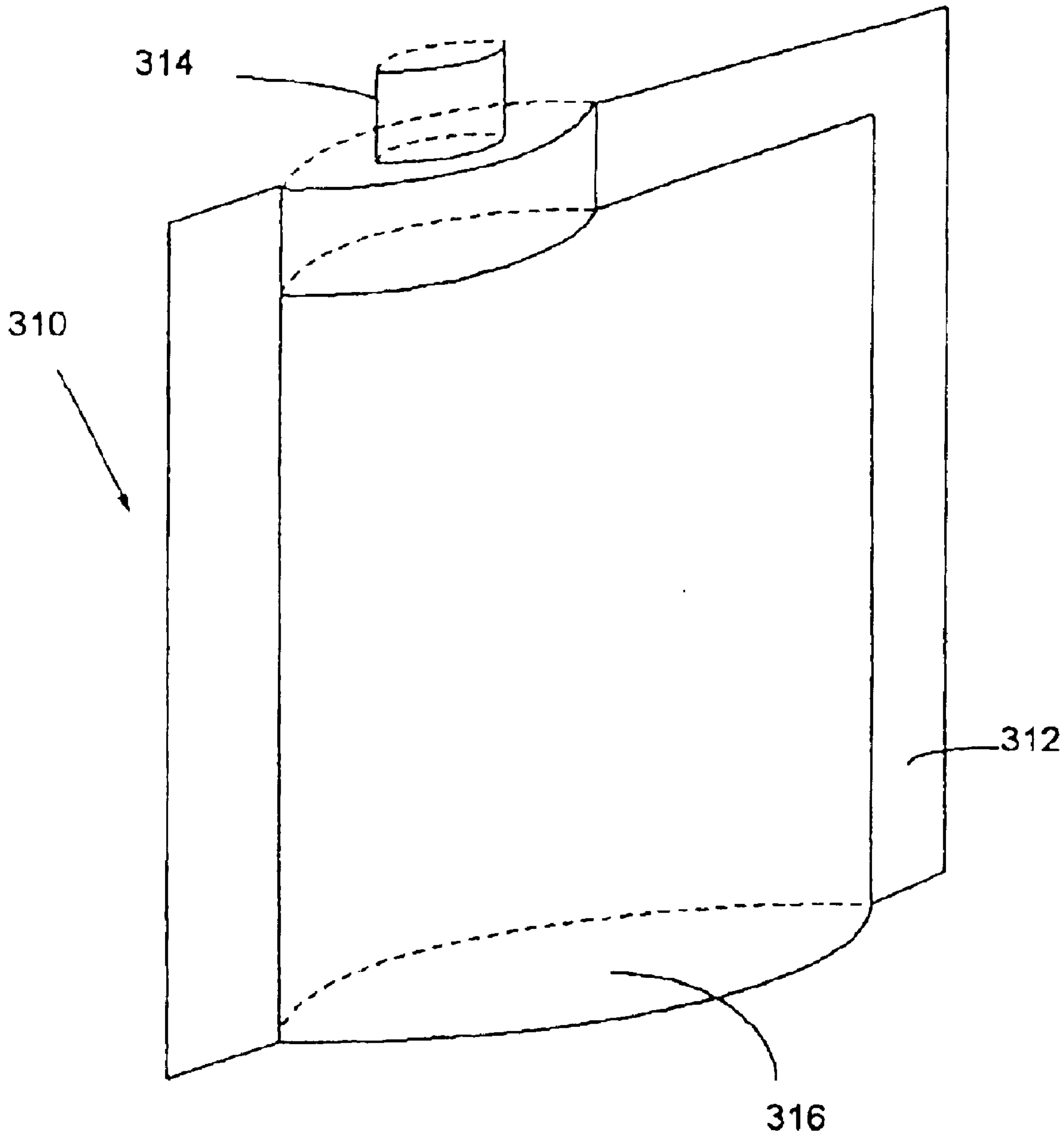
FIG. 8 is a perspective view of a stand up pouch formed from a label and packaging stock in accordance with the present invention and incorporating a fitment.

A preferred pouch is formed as a stand up pouch 310 as shown in FIG. 8, which has a gusset 316 in the bottom that when spread apart by the contents of the pouch, allows the pouch 310 to repose vertically without external support. The pouch 310 is formed by folding and sealing the insulating packaging material such as shown in FIG. 1*b* at the peripheral edges 312 in pouch forming equipment.

After the pouch 310 is formed, a fitment 314 is installed into a surface of the pouch or at its periphery. As shown in FIG. 8, the fitment 314 comprises a tube with screw threads about its outer circumference and an associated threaded cap that can be attached thereto. Examples of such fitments are available from Menshen USA of Waldwick, N.J. The neck of the fitment is held in place at the sealed edge of the pouch either by the sealed edge or by added caulking. Most commonly, the fitment is made of a material that can be heat sealed onto the facing material or polymer sealant layer forming the inner surface of the pouch. The neck or base of the fitment is then welded into the open end of the pouch by heat sealing between heated jaws or other polymer welding technique. Other fitments used to close and seal containers for vacuum packing and/or holding foodstuffs are also embraced generally within the term "fitment" as used herein, including a zipper closure formed with polymer materials, and a plug.

Alternatively, a pouch formed from another material may be wrapped with an insulating label made from a label stock as described above with respect to FIGS. 1 and 1*a*. The label may be bonded either to the container, or to itself along overlapping edges, such as edge 130 in FIGS. 3 and 4.

Figure 4:
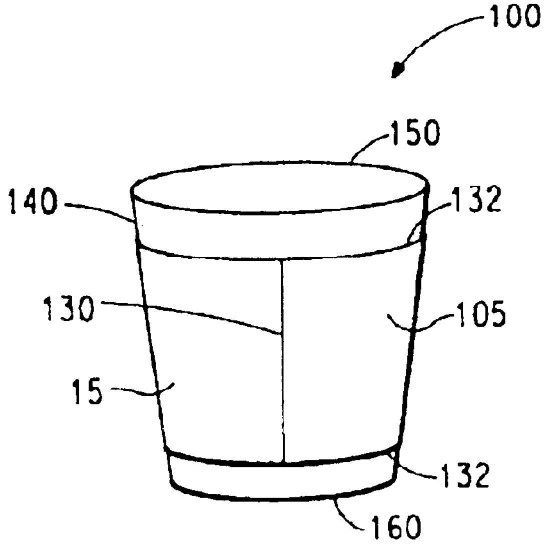
FIG. 4 is a perspective view of a cup wrapped with a label cut from a label stock in accordance with the present invention.

In the embodiment of FIG. 4, cup 140 is of the type commonly used for single serving sizes of hot beverages, such as a disposable coffee cup. Alternatively, the cup may be a carton, such as a carton for a re-heatable or microwaveable frozen food. If the cup is of a conic section design, as in FIG. 4, where the top circumference, shown at 150, is significantly larger than the bottom circumference, shown at

160, the label made from the label stock of the present invention may be shaped in a similar conic section shape so as to fit the cup snugly. In this case, an adhesive would hold the label on the cup.

Further in accordance with the present invention, there is provided a method for making an insulated packaging material. This method is illustrated with reference to FIG. 5. In this method, a sheet of material used for the thermal insulating layer, such as fiberfill batt 30, is fed from a supply roll 45. In addition, face material 10 is fed from a supply roll 40 and is disposed such that coating 12 is oriented away from thermal insulating layer 30 and second layer 14 is facing thermal insulating layer 30. In addition, face material 20 may be fed from a supply roll 50 and is disposed such that the adhesive layer (if required, such being shown at 26 in FIG. 1) is oriented away from the thermal insulating layer. The first layer, such as 13 and 22 as shown in FIG. 1, of the face material is oriented away from the thermal insulating layer, and the second layer of the face material, such as 14 and 24 in FIG. 1, faces the thermal insulating layer 30.

Figure 5:
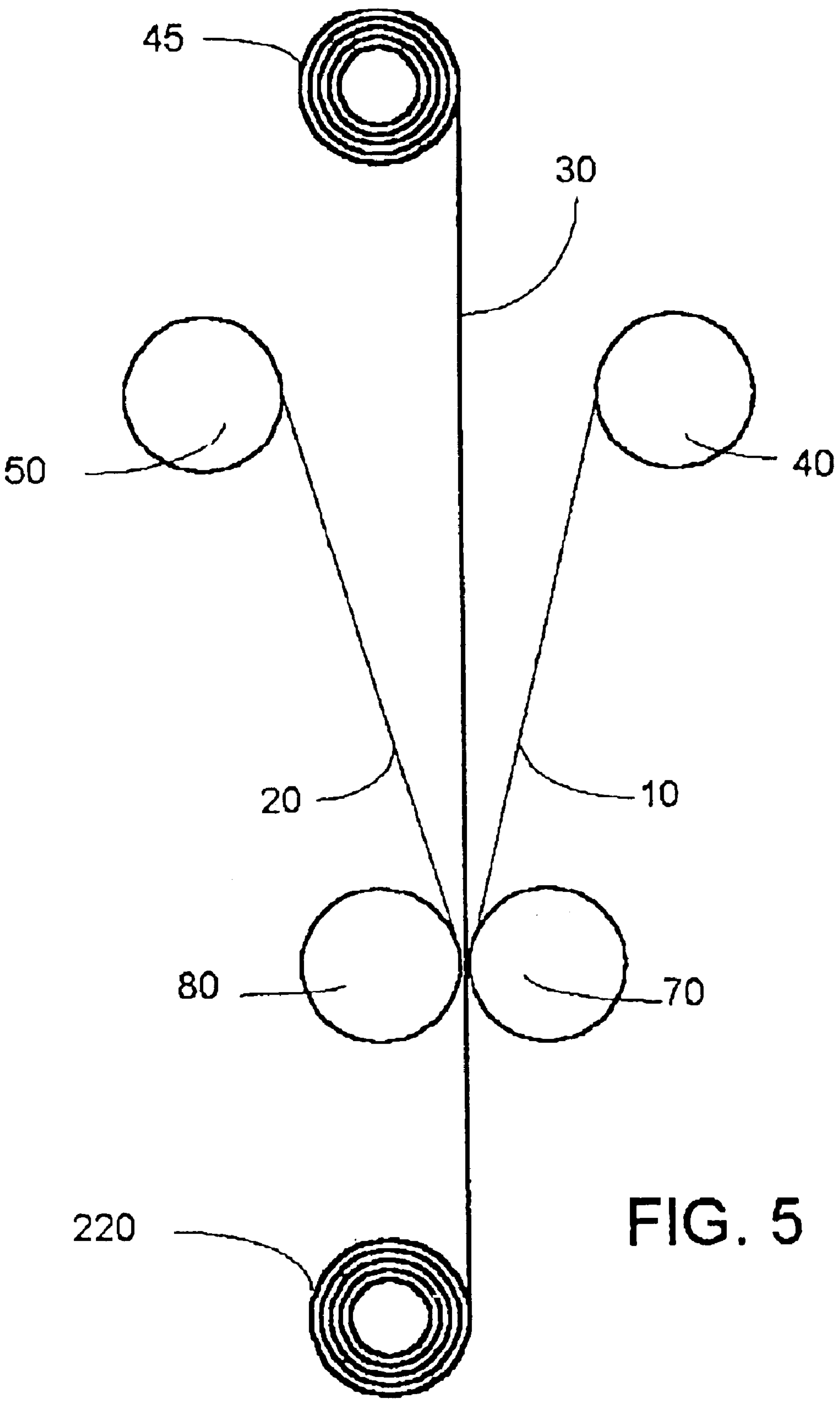
FIG. 5 is a schematic view of one apparatus suitable for making the label and packaging stock according to the present invention.

A sheet of the thermal insulating layer, such as 30, and at least one sheet of face material, such as 10 and/or 20 are fed into a heated calender roll nip between a pair of heated calender rolls 70 and 80, shown in FIG. 5. The heated calender rolls cause the surfaces of the thermal insulating layer and the face material to adhere to each other.

The calender rolls 70 and 80 are heated to a temperature which activates the heat-sealable layer but which does not melt the entire face material as discussed above. This temperature is in the range of 200° F. to 500° F. (93° C. to 260° C.), with the preferred temperature range being 280°–320° F. (137°–160° C.) for the embodiment using co-extruded 48 gauge and 120 gauge films as the face material and a fiberfill batt as the insulating layer. However, higher temperatures in the range of 450°–500° F. (232°–260° C.) can be used at high line speeds, i.e., speeds of 300 to 400 feet (91 to 122 meters) per minute. The calender rolls are displaced from one another at a distance appropriate to create a nip pressure suitable for lamination.

Alternatively, instead of using a co extruded heat sealable film, an adhesive may be applied between the face material and the thermal insulating layer to adhere them together. This adhesive would be applied by a coating roller, not shown, which would be positioned between feed rolls 40 and 50 and calender rolls 70 and 80 in FIG. 5. A packaging material is formed which is pulled through the process equipment by means of a take-up roll 220 as shown in FIG. 5.

A packaging material 5 with a thickness of greater than 0.0075 inch (0.0190 cm.) but less than 0.07 inch (0.1778 cm), preferably between 0.010 inch (0.025 cm.) and 0.040 inch (0.102 cm.), and most preferably between 0.020 inch (0.051 cm.) and 0.030 inch (0.076 cm.) is thus produced. This packaging material could be made with one sheet of face material (not shown), or two sheets of face material, as in FIG. 1, since the thickness of the face material is insignificant compared to the total thickness of the material. The formation of the packaging material may be followed by cutting to desired widths with a hot knife which seals the edges of the packaging material. The packaging material may then be cut to form pouches, which may preferably have sealed edges.

Alternatively, instead of using a single sheet of face material, the thermal insulating layer may be fed between two sheets of face material into the heated calender roll, which causes the surfaces of the thermal insulating layer and the face material to adhere to each other. This embodiment is also illustrated in FIG. 5, where both face materials 10 and 20 are fed to the nip between heated calender rolls 70 and 80. In either embodiment where either one or two sheets of face material are fed between heated calender rolls, the thermal insulating layer batt may be previously printed, thereby eliminating the need for coating the face material to make it printable.

The microwave susceptible coating 60 preferably is applied to the surface of the second layer before the face material 20 is fed to the nip between heated calender rolls 70 and 80. Such coating may be applied when the face material 20 is formed by co-extrusion. Alternatively, the coating 60 may be vapor-coated, sprayed or roller coated to the outer surface of the face material 20, or between the face material 20 and an adhesive layer applied to the face material 20 to adhere the face material 20 to the thermal insulating layer 30. Coating 60 is applied preferably to a thickness of from about 20 to 100 Angstroms, most preferably from about 50 to 70 Angstroms, or to an optical density thickness of from about 0.12 to 0.35 as measured with a Tobias TBX Densitometer, offered by Tobias Associates, Inc. of Glenside, Pa., USA. When vapor-coated, the metallic coating forms a discontinuous film. The coating 60 may be applied only to one surface of the material that forms a pouch, or in a pattern such that no microwave susceptible material will be present along the seams of a pouch. The coating 60 may also be applied in other patterns or varying coating thicknesses to preferentially heat a region of the packaging material more than another region. The coating method described generally in U.S. Pat. 5,021,293 may also be used.

It should be apparent to those skilled in the art that modifications may be made to the method of the present invention without departing from the spirit thereof. For instance, the present invention may alternatively include a method for making an insulated packaging material, wherein a card web comprising thermoplastic staple fibers is fed from a commercially available card machine. This card web is run in place of the fiberfill batt in the process described above with respect to FIG. 5, thereby being deposited directly onto a face material. The card web and face material are subjected to a calendering process, thereby laminating the fibers from the card web to the face material. It should be noted that the packaging material made in accordance with this embodiment is by design thinner than the preferred embodiment thickness, which is between 0.020 inch (0.051 cm.) and 0.030 inch (0.076 cm.), but still would be greater than 0.0075 inch (0.0190 cm.).

The present invention will be illustrated by the following Example. The test method used in the Example is described below.

TEST METHOD

For the following Examples, CLO was measured on a "Thermolabo II", which is an instrument with a refrigerated bath, commercially available from Kato Tekko Co. L.T.D., of Kato Japan, and the bath is available from Allied Fisher Scientific of Pittsburgh, Pa. Lab conditions were 21° C. and 65% relative humidity. The sample was a one-piece sample measuring 10.5 cm×10.5 cm.

The thickness of the sample (in inches) at 6 gm/cm$^2$ was determined using a Frazier Compressometer, commercially available from Frazier Precision Instrument Company, Inc. of Gaithersburg, Md. To measure thickness at 6 g/cm$^2$, the following formula was used to set PSI (pounds per square inch) (kilograms per square centimeter) on the dial:

$$\frac{(6.4516\ \text{cm}^2/\text{in}^2)(6\ \text{g/cm}^2)}{453.6\ \text{g}} = 0.8532\ \text{lb/in}^2$$

A reading of 0.8532 on the Frazier Compressometer Calibration Chart (1 in., or 2.54 cm. diameter presser foot) shows that by setting the top dial to 3.5 psi (0.2 kilograms per square centimeter), thickness at 6 g/cm$^2$ was measured.

The Thermolabo II instrument was then calibrated. The temperature sensor box (BT box) was then set to 10° C. above room temperature. The BT box measured 3.3 inch×3.3 inch (8.4 cm×8.4 cm). A heat plate measuring 2 inch×2 inch was in the center of the box, and was surrounded by styrofoam. Room temperature water was circulated through a metal water box to maintain a constant temperature. A sample was placed on the water box, and the BT box was placed on the sample. The amount of energy (in watts) required for the BT box to maintain its temperature for one minute was recorded. The sample was tested three times, and the following calculations were performed:

$$\text{Heat Conductivity (W/cm}^\circ\text{ C.)} = \frac{(\text{W})(D \times 2.54)}{(A)(\Delta T)}$$

Where:

W=Watts

D=Thickness of sample measured in inches at 6 g/cm$^2$. (6 g/cm$^2$ was used because the weight of the BT box is 150 gm, the area of the heat plate on the BT box was 25 cm$^2$). Multiplying the thickness by 2.54 converted it to centimeters.

A=Area of BT Plate (25 cm)

ΔT=10° C.

$$CLO = \frac{\text{Thickness} \times 0.00164}{\text{Heat Conductivity}}$$

The value of 0.00164 was a combined factor including the correction of 2.54 (correcting thickness from inches to centimeters) times the correction factor of 0.0006461 to convert thermal resistance in cm$^2$×° C./Watts. To convert heat conductivity to resistance, conductivity was put in the denominator of the equation.

EXAMPLE 1

An insulated pouch was made according to the process described above with respect to FIG. 5, except that instead of feeding face materials 10 and 20 from supply rolls, they were fed as individual sheets to the nip. In advance of the nip, the bottom face material 20 was vapor coated with an amount of aluminum metal so as to make it susceptible to heating by microwave radiation. In this example, the aluminum metal deposit had an optical density of 0.20 as measured on the Tobias TBX Densitometer, of Tobias Associates, Inc. of Glenside, Pa., USA.

A fiberfill batt of the type sold by E.I. du Pont de Nemours and Company of Wilmington, Del. under the trademark THERMOLITE® Active Original was used as the thermal insulating layer 30. The fiberfill batt had an areal weight of 100 gm/M$^2$ at a specified thickness of 0.25 inch (0.63 cm), or a bulk density of 0.013 gm/cm$^3$.

A pouch was fashioned from the insulating packaging material. The pouch was made by combining a roll of polyester film laminated to a polyolefin sealant layer with a roll of film composed of two layers of polyester film having a layer of thermal insulator between them. The films used as the face material were of the type sold by DuPont Teijin Films of Wilmington, Del. under the trademark MELINEX® 301-H. (MELINEX® 301-H film is comparable to MELINEX® 854, but lacks the primer coating, such as 12 and 26 shown in FIG. 1). The composition of the heat-sealable layers (e.g. 14 and 24 in FIG. 1) was an isophthalic acid-based copolyester and comprised 10–50% of the total film thickness; 15–30% was preferred.

The face material 10 was 1.2 mils (0.0012 inch, or 0.0030 cm) thick and face material 20 was 0.48 mils (0.00048 inch or 0.00122 cm) thick, and metallized for microwave susceptibility by Dunmore Corporation of Newtown, Pa. The final label stock thickness, after lamination, was 0.025 inch (0.064 cm). A pouch was made from this insulated packaging stock in which the metallized coating was placed on the interior surfaces of the pouch. A pouch was made from this insulated packaging stock using the Emzo® EV1 vertical liquid pouch packaging machine available from Emzo Corp., formerly of Argentina. Alternate pouch making equipment includes the Bartelt IM offered by Klockner Bartelt of Sarasota, Fla., USA and the Toyo Model MS offered by Toyo Machine Mfg. Co. of Nagoya, Japan.

The heat sealable layers were activated at temperatures between 240 and 350° F. (116 to 177° C.). Pouches were produced at a rate of 40 packages per minute.

Figure 6:
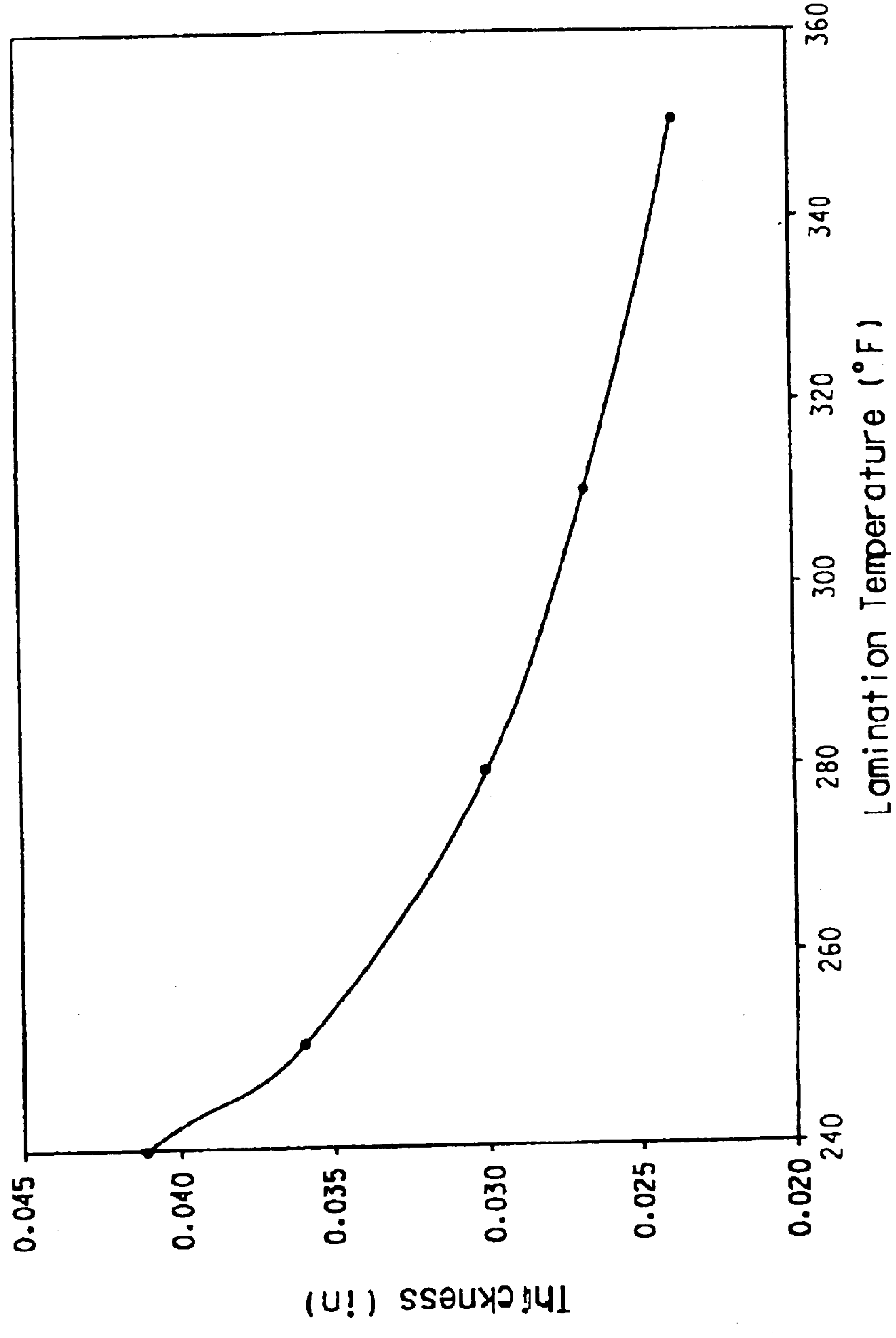
FIG. 6 is a graph showing the temperature at which the heat sealable layers of the face material were activated and laminated to the thermal insulating layer vs. the thickness of the label stock made in Example 1.
Figure 7:
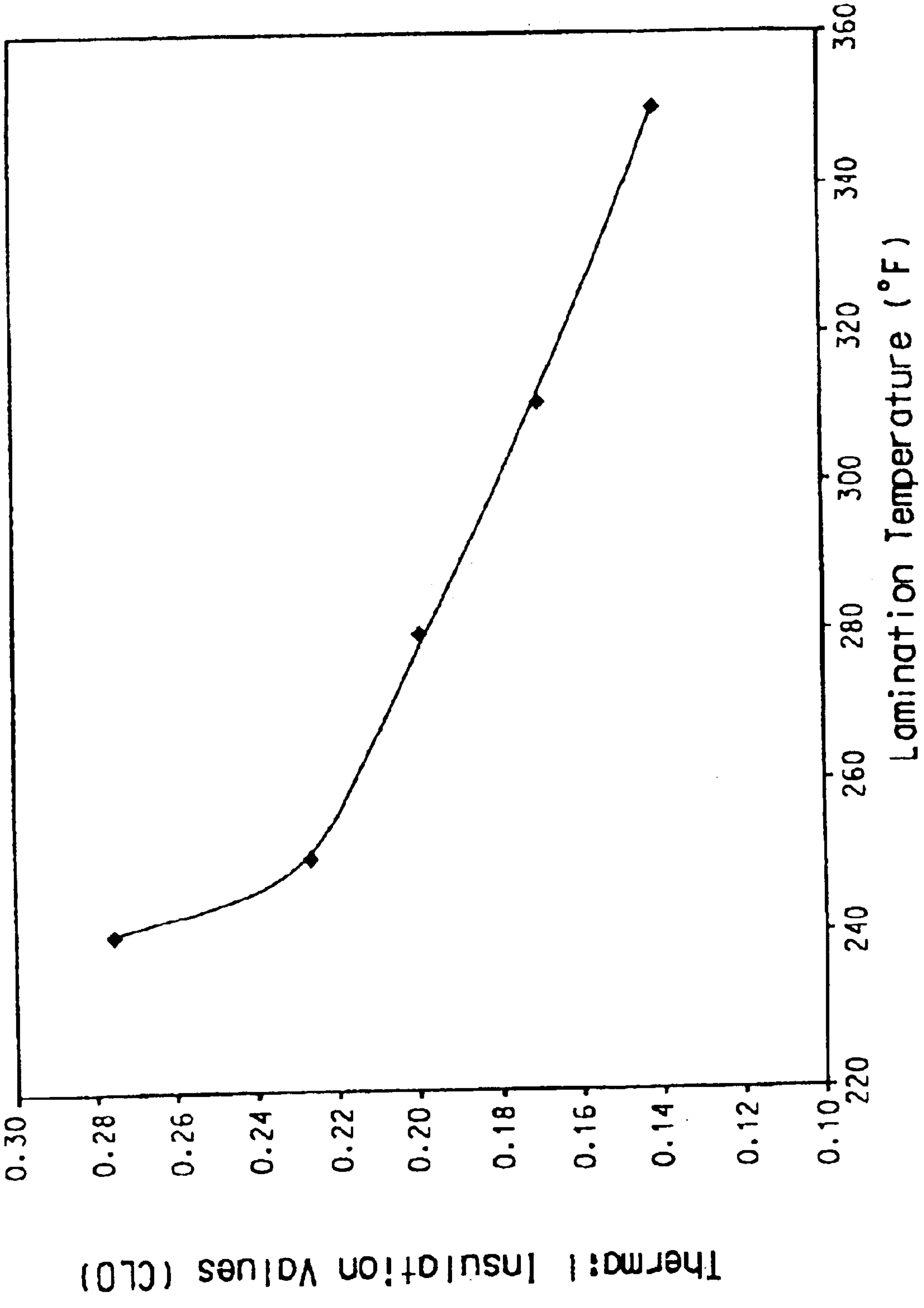
FIG. 7 is a graph showing the temperature at which the heat sealable layers of the face material were activated and laminated to the thermal insulating layer vs. thermal insulation values, as measured in CLO, of the label stock made in Example 1.

Representative data for an insulative packaging material without a microwave susceptible layer is graphed in FIGS. 6 and 7. As can be seen from FIGS. 6 and 7, the effect of using different activation temperatures is to give greater thickness and greater insulation values at the lower temperatures, and less thickness and lower insulation values at the higher temperatures. Similar data would be expected for insulation values for material with a microwave susceptor layer formed into the pouch according to Example 1.

EXAMPLE 2

Insulated pouches having dimensions of 4 inch×4.5 inch (10.2 cm to 11.4 cm) were formed from insulated label stock according to the invention, with one pouch having an insulated label stock laminated structure that incorporated an aluminum layer as a microwave susceptible coating. Each pouch was filled with 150 ml of water and the temperature of the water was measured with a thermometer. Then, each water filled pouch was separately placed within a GE 1600 W turntable microwave oven from General Electric, and heated at the full power setting for 40 seconds. Each pouch then was removed from the oven and the water temperature was again measured. The water in the pouch that included the microwave susceptible coating in the insulating label stock structure was heated to a higher temperature (heated from starting temperature 67.5° F. (19.7° C.) to 128.1° F. (53.4° C.)) than the water in the pouch without the microwave susceptible coating (heated from starting temperature 67.4° F. (19.7° C.) to 107.7° F. (42.1° C.)). The pouch with the microwave susceptible coating therein retained insulation values comparable to Example 1 above.

What is claimed is:

1. A microwave susceptible insulating label stock, comprising:

a sheet of face material formed as a bi-layer film having a first layer and a second layer, wherein said second layer has a lower melting temperature than said first layer;

a microwave susceptible coating applied to a surface of the second layer, said coating having a thickness between 20 and 100 Angstroms; and a thermal insulating layer having a thermal resistance in the range of 0.05 to 0.5 CLO (0.0077 to 0.077 $m^2$*K/W) laminated to the sheet to form the insulating label stock having a thickness of at least 0.0075 inch (0.0190 cm).

2. The insulating label stock of claim 1, wherein the thermal insulating layer comprises a fiberfill batt.

3. The insulating label stock of claim 1, further comprising a printable coating applied to a surface of the face material.

4. The insulating label stock of claim 1, wherein the first and second layers of the face material are formed from a thermoplastic material selected from the group consisting of: polyester, polyethylene and polypropylene.

5. The insulating label stock of claim 1, wherein the microwave susceptible coating is a coating material selected from the group consisting of: aluminum, stainless steel, nickel/iron/molybdenum alloys and nickel/iron/copper alloys.

6. The insulating label stock of claim 1, further comprising a polymer sealant layer applied over the microwave susceptible coating.

7. The insulating label stock of claim 6, wherein the polymer sealant layer is formed from a material selected from the group consisting of: polyethylene, polyester and copolymers and mixtures of such polymers.

8. The insulating label stock of claim 1, wherein the label stock has outer edges and wherein said edges are sealed.

9. The insulating label stock of claim 8, wherein said edges are sealed with a sealant formed from a material selected from the group consisting of: polyethylene, polyester and copolymers and mixtures of such polymers.

10. The insulating label stock of claim 3, wherein the printable material has been printed.

11. An insulated container for holding foodstuff, comprising the insulating label stock of claim 1 applied to a surface of the container for holding foodstuff.

12. The insulated container of claim 11, wherein the container defines an internal volume and the insulated label stock is applied to the container to surround the internal volume.

* * * * *